US012515802B2

(12) United States Patent
Cazenave et al.

(10) Patent No.: US 12,515,802 B2
(45) Date of Patent: Jan. 6, 2026

(54) APPARATUS FOR SUPPLYING OXYGEN TO A VEHICLE USER, AND VEHICLE COMPRISING SUCH AN APPARATUS

(71) Applicant: SAFRAN AEROSYSTEMS, Plaisir (FR)

(72) Inventors: Jean-Michel Cazenave, Moissy-Cramayel (FR); Loic Villard, Moissy-Cramayel (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 748 days.

(21) Appl. No.: 17/791,763

(22) PCT Filed: Dec. 9, 2020

(86) PCT No.: PCT/EP2020/085187
§ 371 (c)(1),
(2) Date: Jul. 8, 2022

(87) PCT Pub. No.: WO2021/139947
PCT Pub. Date: Jul. 15, 2021

(65) Prior Publication Data
US 2023/0032906 A1 Feb. 2, 2023

(30) Foreign Application Priority Data
Jan. 9, 2020 (FR) .................. FR 2000148

(51) Int. Cl.
*B64D 13/02* (2006.01)
*A62B 7/02* (2006.01)
(Continued)

(52) U.S. Cl.
CPC ............. *B64D 13/02* (2013.01); *A62B 7/02* (2013.01); *A62B 7/14* (2013.01); *A62B 9/00* (2013.01);
(Continued)

(58) Field of Classification Search
CPC ........ B64D 13/02; B64D 10/00; B64D 45/00; B64D 13/00; B64D 2231/02; A62B 7/02;
(Continued)

(56) References Cited

U.S. PATENT DOCUMENTS 3,572,331 A 3/1971 Kissen
4,781,216 A 11/1988 Arnoult et al.
(Continued)

FOREIGN PATENT DOCUMENTS

EP 0 278 861 8/1988
EP 0 499 505 8/1992
(Continued)

OTHER PUBLICATIONS

International Search Report and Written Report for PCT/EP2020/85187, mailed Mar. 3, 2021.
(Continued)

*Primary Examiner* — Tu A Vo
(74) *Attorney, Agent, or Firm* — Burris Law, PLLC

(57) ABSTRACT

Apparatus for supplying oxygen to a vehicle user, comprising a source of pressurized respiratory gas containing oxygen-enriched air, a flow-regulating and/or pressure-regulating unit, and at least one mask provided for supplying gas to the respiratory tract of said user, the regulating unit comprising at least one inlet connected to the source and at least one outlet connected to the mask, the regulating unit being configured to regulate the flow and/or the pressure of the respiratory gas supplied to the mask according to the respiratory demand of the user, the apparatus comprising at least one sensor measuring the pressure and/or the flow of respiratory gas delivered by the regulating unit to the mask, and an electronic data storage and processing unit configured to receive the measurements from the at least one sensor and to calculate, from these measurements, the frequency of the gas
(Continued)

flows supplied to the mask and corresponding to the respiratory frequency of the user, to compare this calculated frequency against a threshold frequency and, when this calculated frequency is greater than the threshold frequency, to generate an audible and/or visual and/or vibratory warning signal.

12 Claims, 1 Drawing Sheet

(51) Int. Cl.
    *A62B 7/14*      (2006.01)
    *A62B 9/00*      (2006.01)
    *B64D 10/00*      (2006.01)
    *B64D 13/00*      (2006.01)
    *B64D 45/00*      (2006.01)

(52) U.S. Cl.
    CPC .............. *A62B 9/006* (2013.01); *B64D 10/00* (2013.01); *B64D 13/00* (2013.01); *B64D 45/00* (2013.01); *B64D 2231/02* (2013.01)

(58) Field of Classification Search
    CPC .. A62B 9/00; A62B 9/006; A62B 7/14; A62B 7/00; A62B 7/04; A62B 7/06; A62B 7/08; A62B 7/10; A62B 7/12
    See application file for complete search history.

(56) References Cited

U.S. PATENT DOCUMENTS

| | | | |
|---|---|---|---|
| 5,261,457 A | | 11/1993 | Zapata et al. |
| 11,172,845 B1* | | 11/2021 | Everman .............. G01N 33/497 |
| 2003/0192547 A1* | | 10/2003 | Lurie ................... G09B 23/288 |
| | | | 128/207.12 |
| 2014/0275820 A1* | | 9/2014 | Varga ................. A61M 16/0084 |
| | | | 600/300 |
| 2016/0245830 A1* | | 8/2016 | Mace ...................... G16H 50/20 |
| 2017/0296094 A1* | | 10/2017 | Fonzi, III ............. A61B 5/0002 |
| 2018/0078798 A1* | | 3/2018 | Fabian .................... A62B 18/10 |
| 2018/0126194 A1* | | 5/2018 | Salin ........................ A62B 7/08 |

FOREIGN PATENT DOCUMENTS

| | | | | |
|---|---|---|---|---|
| EP | 3459857 A1 * | 3/2019 | ........... | A61B 5/0015 |
| FR | 2 894 562 | 6/2007 | | |
| WO | WO-2006113900 A2 * | 10/2006 | ............. | A61B 5/486 |
| WO | WO-2021094323 A1 * | 5/2021 | ............... | A62B 7/14 |

OTHER PUBLICATIONS

French Search Report and Written Opinion for FR 2 000 148, mailed Sep. 30, 2020.

* cited by examiner

APPARATUS FOR SUPPLYING OXYGEN TO A VEHICLE USER, AND VEHICLE COMPRISING SUCH AN APPARATUS

CROSS-REFERENCE TO RELATED APPLICATIONS

This application is a § 371 of International PCT Application PCT/EP2020/085187, filed Dec. 9, 2020, which claims § 119(a) foreign priority to French patent application FR 2000148, filed Jan. 9, 2020.

BACKGROUND

Field of the Invention

The invention relates to an apparatus for supplying oxygen to a vehicle user, and also a vehicle comprising such an apparatus.

The invention relates more particularly to an apparatus for supplying oxygen to a vehicle user, in particular an aircraft pilot, comprising a source of pressurized respiratory gas containing oxygen-enriched air, a flow-regulating and/or pressure-regulating unit, and at least one mask provided for supplying gas to the respiratory tract of said user, the regulating unit comprising at least one inlet connected to the source and at least one outlet connected to the mask, the regulating unit being configured to regulate the flow and/or the pressure of the respiratory gas supplied to the mask according to the respiratory demand of the user, the apparatus comprising at least one sensor measuring the pressure and/or the flow of respiratory gas delivered by the regulating unit to the mask.

Related Art

Military aircraft pilots are supplied with oxygen-enriched air through masks. These pilots may experience various physiological deficits such as: hypoxia, hypocapnia, hypercapnia. One difficulty is to be able to detect and prevent the onset of these episodes.

Hypocapnia (insufficient carbon dioxide, that is to say a decrease in the partial pressure of CO2 in the body) is very often responsible, at least in part, for the discomfort. The risk of hypocapnia exists whenever the quantity of carbon dioxide released by the lungs (during the exhalation phase) is greater than the quantity of CO2 produced by the metabolism. This can occur as a result of motion sickness (even for experienced pilots), anxiety (or even fear), hypoxia (insufficient oxygen in the body), the actual oxygen inhaler (due to resistance to inhalation in the case of a strong inspiratory demand).

A known solution is to provide a carbon dioxide sensor in order to measure the content thereof in the exhaled gases. However, this solution is difficult to implement and does not make it possible to remedy or prevent the problems encountered.

SUMMARY OF THE INVENTION

An object of the present invention is to overcome all or some of the drawbacks of the prior art noted above.

To this end, the apparatus according to the invention, moreover in accordance with the generic definition given in the preamble above, is essentially characterized in that the apparatus comprises an electronic data storage and processing unit configured to receive the measurements from the at least one sensor and to calculate, from these measurements, the frequency of the gas flows supplied to the mask and corresponding to the respiratory frequency of the user, to compare this calculated frequency against a threshold frequency and, when this calculated frequency is greater than the threshold frequency, to generate an audible and/or visual and/or vibratory warning signal.

Furthermore, embodiments of the invention may include one or more of the following features:

- the at least one sensor comprises a pressure sensor measuring the pressure of respiratory gas delivered by the regulating unit, the electronic data storage and processing unit being configured to calculate the frequency of the respiratory gas flows supplied to the mask by detecting the successive determined negative pressures in the respiratory gas flows supplied to the mask from the pressure measurement of the pressure sensor, the electronic data storage and processing unit being additionally configured to calculate the frequency of the respiratory gas flows supplied to the mask by measuring the frequency of said determined negative pressures,
- the at least one sensor comprises a flow sensor measuring the flow of respiratory gas delivered by the regulating unit, the electronic data storage and processing unit being configured to calculate the frequency of the respiratory gas flows supplied to the mask by detecting the successive determined variations in the flow of the respiratory gas flows supplied to the mask from the flow measurement of the flow sensor, the electronic data storage and processing unit being additionally configured to calculate the frequency of the respiratory gas flows supplied to the mask by measuring the frequency of said determined flow variations,
- the apparatus comprises a display connected to the electronic data storage and processing unit, the electronic data storage and processing unit controlling the display of a warning signal when said calculated frequency is greater than the threshold frequency,
- the electronic data storage and processing unit is configured to control the display of a signal indicative of correct operation when the difference between the calculated frequency and the threshold frequency is less than a determined value,
- the electronic data storage and processing unit is configured to control the display or acoustic emission of a periodic signal having a frequency corresponding to a target frequency,
- the electronic data storage and processing unit is configured to permit manual or automatic modification of the value of the threshold frequency,
- the value of the threshold frequency is modified according to at least one of the following: the identity of the user, the physiology of the user, the flight altitude of the vehicle, a load factor experienced by the user and inherent to the maneuvers of the vehicle, the phase of movement of the vehicle (in particular take-off, cruising and landing in the case of a flying vehicle), the nature of the vehicle path, the speed of the vehicle,
- the value of the threshold frequency is selected from among a plurality of predefined predetermined threshold frequencies,
- the at least one sensor is located at the level of the regulating unit and/or at the level of the mask,
- the flow-regulating and pressure-regulating unit comprises a mechanical or electromechanical demand valve.

The invention also relates a vehicle, in particular an aircraft, comprising an apparatus according to any one of the features above or below.

The invention may also relate to any alternative device or method comprising any combination of the features above or below within the scope of the claims.

BRIEF DESCRIPTION OF THE FIGURES

Further particular features and advantages will become apparent on reading the description below, made with reference to the figures, in which.

DETAILED DESCRIPTION OF THE INVENTION

Figure 1:
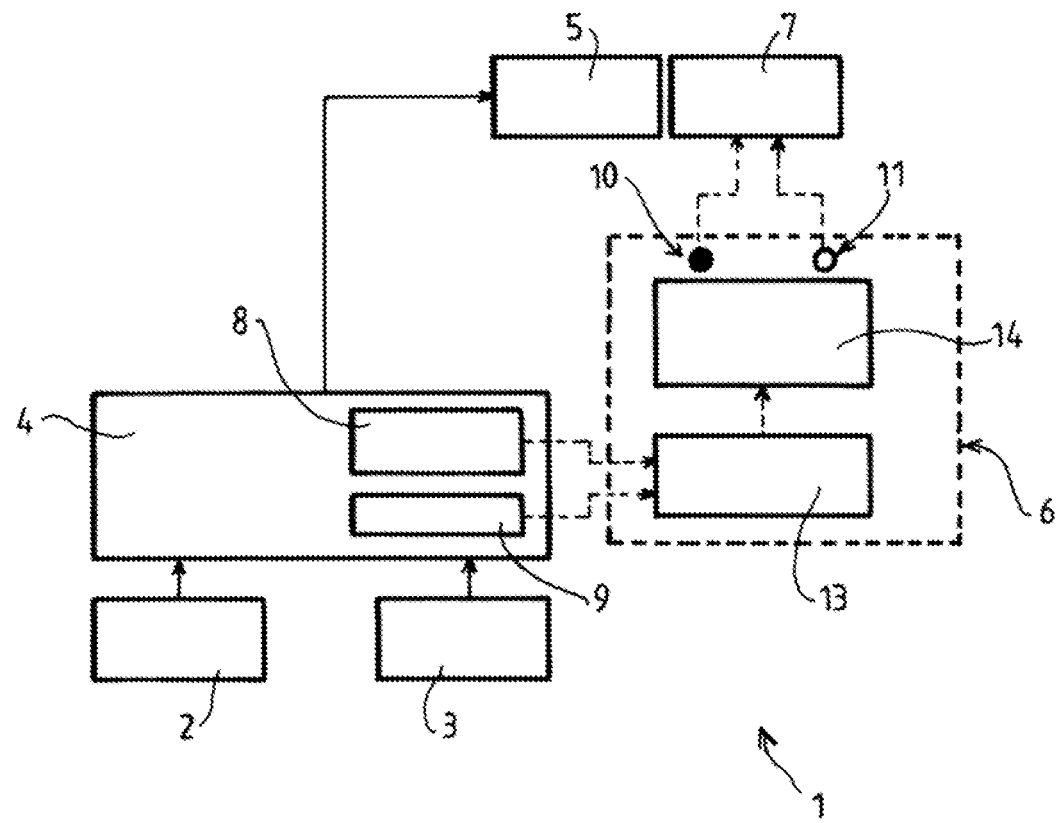
FIG. 1 shows a schematic and partial view illustrating a possible embodiment of the structure and the operation of an apparatus according to the invention.

The illustrated apparatus 1 for supplying oxygen to a vehicle user, in particular an aircraft pilot, comprises a circuit provided with a source 2, 3 of pressurized oxygen (pure oxygen or oxygen-enriched air), a unit 4 for regulating the flow and/or pressure of oxygen, and at least one mask 5 provided to supply oxygen to the respiratory tract of said user.

The source may comprise one or more tanks 2, 3 of pressurized gaseous oxygen and/or any other suitable source.

The regulating unit 4 can comprise a mechanical or electromechanical demand valve or any other suitable device; for example, the regulating unit can comprise a valve as described in one of the following documents: EP0499505A1, EP0278861A1 or FR2894562 A1.

The regulating unit 4 comprises at least one inlet connected to the source or sources 2, 3 of pressurized oxygen, and at least one outlet connected to the mask 5.

The regulating unit 4 is configured to regulate the flow and/or the pressure of oxygen supplied to the mask 5 from the source 2, 3 according to the respiratory demand of the user 7.

In other words, the regulating unit is preferably a valve of the "on demand" type, that is to say delivering a flow of oxygen in response to an inhalation by the user 7. In other words, it is the inhaling action performed by the user that controls the flow of oxygen-enriched air. The regulation is effected within the regulator 4.

The apparatus 1 further comprises at least one sensor 8, 9 measuring the pressure and/or the flow of oxygen delivered by the regulating unit 4 to the mask 5, and an electronic data storage and processing unit 6. This electronic unit 6 can in particular comprise a microprocessor, a computer, a calculator or any other suitable system.

The electronic unit 6 is configured (for example connected and programmed) to receive the measurements from the at least one sensor 8, 9 and to calculate 13, from these measurements, the frequency of the oxygen flows supplied to the mask 5 and corresponding to the respiratory frequency of the user, to compare 14 this calculated frequency against a determined threshold frequency and, when this calculated frequency is greater than the threshold frequency, to generate an audible and/or visual and/or vibratory warning signal 10.

This simple and effective solution for preventing hypocapnia therefore involves informing the user (pilot) when his breathing rate increases abnormally. As is described in more detail below, advantageously, the apparatus 1 can optionally offer the user a solution in order to regulate this respiratory frequency.

The at least sensor comprises, for example, a pressure sensor 8 measuring the oxygen pressure delivered by the regulating unit 4. The electronic unit 6 is configured to calculate the frequency of the oxygen flows supplied to the mask 5 by detecting the successive determined negative pressures in the oxygen flows supplied to the mask 5 from the pressure measurement of the pressure sensor 8 (negative pressures in the circuit that are caused by the user's inhalations). The electronic data storage and processing unit 6 can be configured to calculate the frequency of the oxygen flows supplied to the mask 5 by measuring the frequency of said determined negative pressures.

The respiratory frequency is obtained by measuring the time between two negative pressures (that is to say between two inhalations). Once this value has been obtained, it can be compared against a predefined threshold and, if it exceeds this, an alarm is triggered (an indicator light 10, for example).

Thus, the electronic unit 6 can perform a count of the detected inhalations (to determine the respiratory frequency) and use a digital comparator (to compare the respiratory frequency against the predefined threshold frequency).

Alternatively, the sensor can be a flow sensor 9 measuring the flow of oxygen delivered by the regulating unit 4. The electronic data storage and processing unit 6 can be configured to calculate the frequency of the oxygen flows supplied to the mask 5 by detecting the determined successive variations in the flow rate of the oxygen flows supplied to the mask 5 from the flow measurement of the flow sensor 9. As before, the electronic data storage and processing unit 6 is additionally configured to calculate the frequency of the oxygen flows supplied to the mask 5 by measuring the frequency of said determined flow variations.

Generally, a flow sensor 9 is provided in particular to detect any anomaly or failure. Indeed, a zero flow indicates that the user 7 is not breathing or that there is an interruption in the supply of gas. A failure of the regulator 4 can also be detected if the detected flow is too low or too high with respect to limit setpoints. Poor sealing downstream of the regulator 4 can also be detected (in the event of a leak at the level of the mask 5 for example: excessive flow).

As is illustrated in FIG. 1, the apparatus can include both a pressure sensor 8 and a flow sensor 9. The calculation of the frequency of the oxygen flows supplied to the mask 5 can be based on the measurements of one or both of the sensors.

The electronic unit 6 can be configured to control the display of a signal indicative of correct operation (a green light, for example) when the difference between the calculated frequency and the threshold frequency is less than a determined value.

The apparatus 1 may comprise a display dedicated to this respiratory frequency information or may use a display (diode, screen or other) already present, such as an indicator light which makes it possible to provide an alert when the measured flow presents an anomaly ("no flow" or "full flow").

Thus, the measurement of the breathing rate (from the measurement of the inhaled flow and/or pressure) makes it possible to detect hyperventilation and thus prevent the risk of hypocapnia. This measurement is then compared to a previously defined threshold and, if it is exceeded, an alarm is signaled to the user. The latter, once informed, can therefore concentrate on his breathing in order to recover a "normal" breathing rate and can thus avoid experiencing hypocapnia.

To help the pilot reduce his breathing rate, the apparatus 1 can include an additional functionality. For example, the electronic unit 6 can be configured to control the display or the acoustic or vibratory emission of a periodic signal having a frequency corresponding to a target frequency.

This target frequency can be a reference value, which can be distinct from the threshold frequency (in particular less than or equal to the threshold frequency). The threshold frequency is the limit value from which there is a risk of hypocapnia.

Thus, in order to help the user 7, a second light 11 can flash (or a buzzer can emit sounds) at a frequency equal to the target respiratory frequency that he has to reach. This allows the user to modify his respiratory frequency himself.

Figure 2:
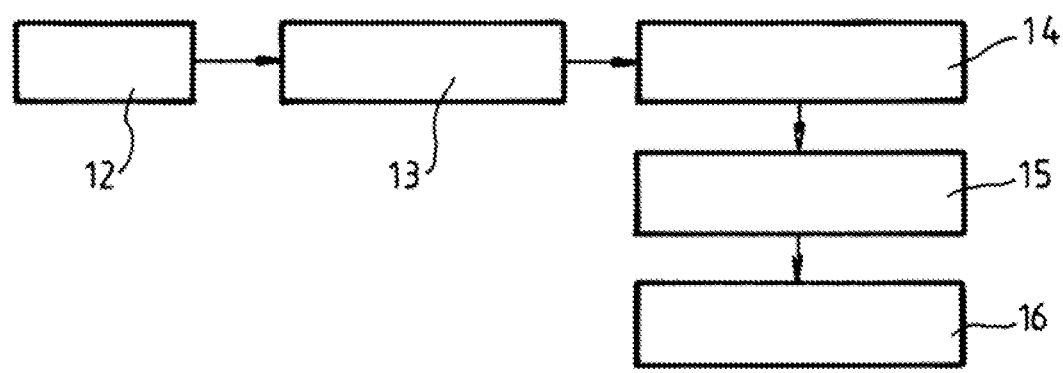
FIG. 2 shows a schematic and partial view illustrating a possible example of operation of an apparatus according to the invention.

As is shown schematically in FIG. 2, the apparatus can therefore carry out the following steps: measurement 12 of a negative pressure and/or variation in flow, calculation 13 of the corresponding respiration frequency, comparison 15 of this calculated frequency against a predefined threshold frequency, and generation 16 of a help signal in order to help the user reach the target frequency.

This simple solution, easy to implement (possibly on current equipment that already has the necessary components), makes it possible to prevent the phenomenon of hypocapnia, by anticipating its appearance, and therefore to greatly reduce the number of dangerous physiological episodes.

The apparatus 1 provides simplicity of operation and implementation. It makes it possible to inform the user 7 in a simple way that he has a breathing rate that is too high. If necessary, it can help the user find a "normal" rate.

In these possible embodiments, the threshold frequency could be adapted to each situation and/or to each user, in particular to the different phases of flight in the case of use in an aircraft.

For example, different threshold frequency levels could be envisioned (specific to each pilot for example) depending on at least one of the following:
  the cabin altitude (the threshold frequency could be relatively higher if the altitude increases),
  the load factor experienced by the user and inherent to the maneuvers of the vehicle,
  the flight phase (take-off, cruising, landing, etc.) whose load factor and altitude parameters are known beforehand,
the level of stress and/or the mental burden experienced by the pilot (which depends for example on the complexity of the mission). Of course, this threshold frequency could be adapted according to any other factor that could have an impact on the physiology of the pilot.

Reference may be made for example to the MIL-D-19326H standard, which gives correction coefficients for the reference ventilation used for oxygen supply systems according to the phases of the mission, or the number of crew members.

Moreover, these threshold frequency levels could be determined beforehand via a personalized physiological analysis carried out on the pilot. This additional function might require an interface with the pilot so that he can adapt the function to his own physiology. Several solutions may be envisioned. For example, several predefined "profiles" could be pre-recorded in the equipment, the pilot choosing the profile closest to his own (for example via a selector such as a potentiometer type button). In another solution, the pilot could introduce an element (electronic card or code or other data carrier) into the equipment in order to identify himself and load his profile (that is to say his own threshold frequencies).

In the examples above, the sensors 8, 9 are shown at the level of the regulating unit 4. Of course, a sensor inside the mask 5 itself or elsewhere in the circuit would also make it possible to measure the respiratory frequency of the pilot 7.

Moreover, the communication with the pilot 7 has been described using a visual example, but it could be different: by means of vibrations for example, or even by means of acoustic signals ("beeps"—with a frequency always modeled on that of the desired breathing rate).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An apparatus for supplying oxygen to a pilot of an aircraft, comprising:
  a source of pressurized respiratory gas containing oxygen-enriched air;
  at least one mask provided for supplying gas to a respiratory track of the aircraft pilot;
  a flow-regulating and/or pressure-regulating unit comprising at least one inlet connected to the source and at least one outlet connected to the mask, the flow-regulating and/or pressure-regulating unit being configured to regulate a flow and/or a pressure of said respiratory gas delivered to said mask according to a respiratory demand of the aircraft pilot;

at least one sensor measuring the pressure and/or the flow of said respiratory gas delivered to said mask;

an electronic data storage and processing unit; and a display, for displaying a warning signal, connected to the electronic data storage and processing unit, wherein the electronic data storage and processing unit is configured to:

receive pressure and/or flow measurements from the at least one sensor;

calculate, from said measurements, a frequency of flows of said respiratory gas delivered to said mask that corresponds to a respiratory frequency of the aircraft pilot;

compare said calculated frequency against a threshold frequency from which there is a risk of hypocapnia;

when said calculated frequency is greater than said threshold frequency, control said display to generate an audible and/or visual and/or vibratory warning signal; and control said display to generate an acoustic emission of a periodic signal that has a frequency corresponding to a target frequency that is less than or equal to said threshold frequency.

2. The apparatus of claim 1, wherein said at least one sensor comprises a pressure sensor measuring the pressure of respiratory gas delivered to said mask and said electronic data storage and processing unit is configured to calculate said frequency of the respiratory gas flows supplied to said mask by detecting successive determined negative pressures in said flows of said respiratory gas supplied to said mask from pressure measurements of said pressure sensor and measuring a frequency of said determined negative pressures.

3. The apparatus of claim 1, wherein said at least one sensor comprises a flow sensor measuring said flow of respiratory gas delivered to said mask and said electronic data storage and processing unit is configured to calculate said frequency of said respiratory gas flows supplied to said mask by detecting successive determined variations in said flow of said respiratory gas flows supplied to said mask from said flow measurement of the flow sensor and calculate said frequency of the respiratory gas flows supplied to the mask by measuring said frequency of said determined flow variations.

4. The apparatus of claim 1, said electronic data storage and processing unit is configured to control said display when a difference between said calculated frequency and said threshold frequency is less than a determined value.

5. The apparatus of claim 1, wherein said electronic data storage and processing unit is configured to permit manual or automatic modification of said value of the threshold frequency.

6. The apparatus of claim 5, wherein said value of said threshold frequency is modified according to at least one of the following: i) an identity of the aircraft pilot, a physiology of the aircraft pilot, ii) a flight altitude of the aircraft, iii) a load factor experienced by the aircraft pilot and inherent to maneuvers of the aircraft, iv) a phase of movement of the aircraft including take-off, cruising and/or landing, v) a nature of the aircraft path, and vi) a speed of the aircraft.

7. The apparatus of claim 5, wherein said value of said threshold frequency is selected from among a plurality of predefined predetermined threshold frequencies.

8. The apparatus of claim 1, wherein said at least one sensor is located at a level of said flow-regulating and/or pressure-regulating unit and/or at a level of said mask.

9. The apparatus of claim 1, wherein said flow-regulating and pressure-regulating unit comprises a mechanical or electromechanical demand valve.

10. An aircraft vehicle that includes the apparatus of claim 1.

11. The aircraft vehicle of claim 10, wherein said electronic data storage and processing unit is configured to permit manual or automatic modification of said value of the threshold frequency.

12. The aircraft vehicle of claim 10, wherein said value of said threshold frequency is modified according to at least one of the following: i) an identity of the aircraft pilot, ii) a physiology of the aircraft pilot, iii) a flight altitude of the aircraft, iv) a load factor experienced by the aircraft pilot and inherent to maneuvers of the aircraft, v) a phase of movement of the aircraft including take-off, cruising and/or landing, and vi) a speed of the aircraft.

* * * * *